United States Patent [19]
Purcell

[11] Patent Number: 5,477,543
[45] Date of Patent: Dec. 19, 1995

[54] STRUCTURE AND METHOD FOR SHIFTING AND REORDERING A PLURALITY OF DATA BYTES

[75] Inventor: Stephen C. Purcell, Mountain View, Calif.

[73] Assignee: Chromatic Research, Inc., Mountain View, Calif.

[21] Appl. No.: 285,379

[22] Filed: Aug. 3, 1994

[51] Int. Cl.[6] ........................................... G06F 7/00
[52] U.S. Cl. ........................... 370/112; 364/715.08
[58] Field of Search ..................... 377/64, 67, 69, 377/70; 364/715.01, 715.08; 370/112, 99

[56] References Cited

U.S. PATENT DOCUMENTS

| | | | |
|---|---|---|---|
| 4,807,172 | 2/1989 | Nukiyama | 364/715.08 |
| 4,931,925 | 6/1990 | Utsumi et al. | 364/715.08 |
| 4,962,511 | 10/1990 | Tokumaru | 364/715.08 |
| 5,166,898 | 11/1992 | Ishihara | 364/715.08 |

Primary Examiner—Benedict V. Safourek
Attorney, Agent, or Firm—Skjerven, Morrill, MacPherson, Franklin & Friel; Alan H. MacPherson; E. Eric Hoffman

[57] ABSTRACT

A shifter circuit and method for simultaneously and independently shifting and reordering a plurality of data bytes. The shifter circuit includes first and second registers which each receive a plurality of data bytes. The first register is coupled to a plurality of first buses, with each of the first buses receiving a data byte from the first register. Similarly, the second register is coupled to a plurality of second buses, with each of the second buses receiving a data byte from the second register. A multiplicity of third buses are coupled to the first and second buses. A byte shifting multiplexer is coupled to each of the third buses. A plurality of bit shifting multiplexer are coupled to the byte shifting multiplexers, with each bit shifting multiplexer being coupled to a pair of byte shifting multiplexers. A control circuit is coupled to the byte shifting and bit shifting multiplexers. The control circuit provides for independent control of each of the byte shifting multiplexers. The control circuit also provides for independent control of each of the bit shifting multiplexers.

14 Claims, 4 Drawing Sheets

5,477,543

STRUCTURE AND METHOD FOR SHIFTING AND REORDERING A PLURALITY OF DATA BYTES

BACKGROUND OF THE INVENTION

1. Field of the Invention

The present invention relates to shifter circuitry for use in a data processing system. In particular, the present invention relates to a structure and method for independently shifting a plurality of bytes in a data processing system.

2. Description of the Prior Art

Real time digital signal processing in applications such as video signal processing requires high computational rates. To help achieve these rates, shifter circuitry has been used to shift a plurality of data bytes. Prior art shifters typically utilize barrel shifter circuitry to allow a plurality of bytes to be shifted by a fixed number of bits. That is, all bytes are shifted in the same direction by the same number of bits.

In addition to byte shifting, certain data processing operations require byte reordering. This reordering is typically performed by separate multiplexer circuitry. As a result of the separate byte shifting and reordering circuitry, the speed of prior art video signal processing has been limited. In addition, the prior art byte shifting and reordering circuitry consumes a relatively large area on the video signal processing chip.

It would therefore be desirable to have a shifter circuit which exhibits a reduced layout area and allows data bytes to be independently shifted and reordered on the same clock cycle.

SUMMARY OF THE INVENTION

In accordance with the present invention, a shifter circuit is provided to independently shift and/or reorder a plurality of data bytes. This shifter circuit includes first and second registers which each receive a plurality of data bytes. The first register is coupled to a plurality of first buses, with each of the first buses receiving a data byte from the first register. Similarly, the second register is coupled to a plurality of second buses, with each of the second buses receiving a data byte from the second register. A multiplicity of third buses are coupled to the first and second buses.

Byte shifting multiplexers are coupled to each of the third buses. A plurality of bit shifting multiplexers are coupled to the byte shifting multiplexers, with each bit shifting multiplexer being coupled to a pair of byte shifting multiplexers. A control circuit is coupled to the byte shifting and bit shifting multiplexers. The control circuit provides for independent control of each of the byte shifting multiplexers. The control circuit also provides for independent control of each of the bit shifting multiplexers.

In an alternate embodiment, a first multiplexer is coupled to each of the first buses and a second multiplexer is coupled to each of the second buses. A multiplicity of intermediate multiplexers are each coupled to at least one of the first buses and at least one of the second buses.

A control circuit is coupled to the first, second and intermediate multiplexers to control the routing of the data bytes. The control circuit independently controls each of the first, second and intermediate multiplexers, such that these multiplexers can simultaneously perform shifting and reordering of the data bytes. This advantageously increases the speed of the shifter circuit. The shifter circuit also eliminates the need for separate byte shifting and reordering circuitry, thereby reducing the layout area of the shifter circuit.

In another embodiment, the shifter circuit includes a plurality of bit shifting multiplexers coupled to the first, second and intermediate multiplexers and to the control circuitry. Each of the bit shifting multiplexers is independently controlled by the control circuitry.

The present invention will be more fully understood in view of the following drawings taken together with the detailed description.

DETAILED DESCRIPTION OF THE INVENTION

Figure 1:
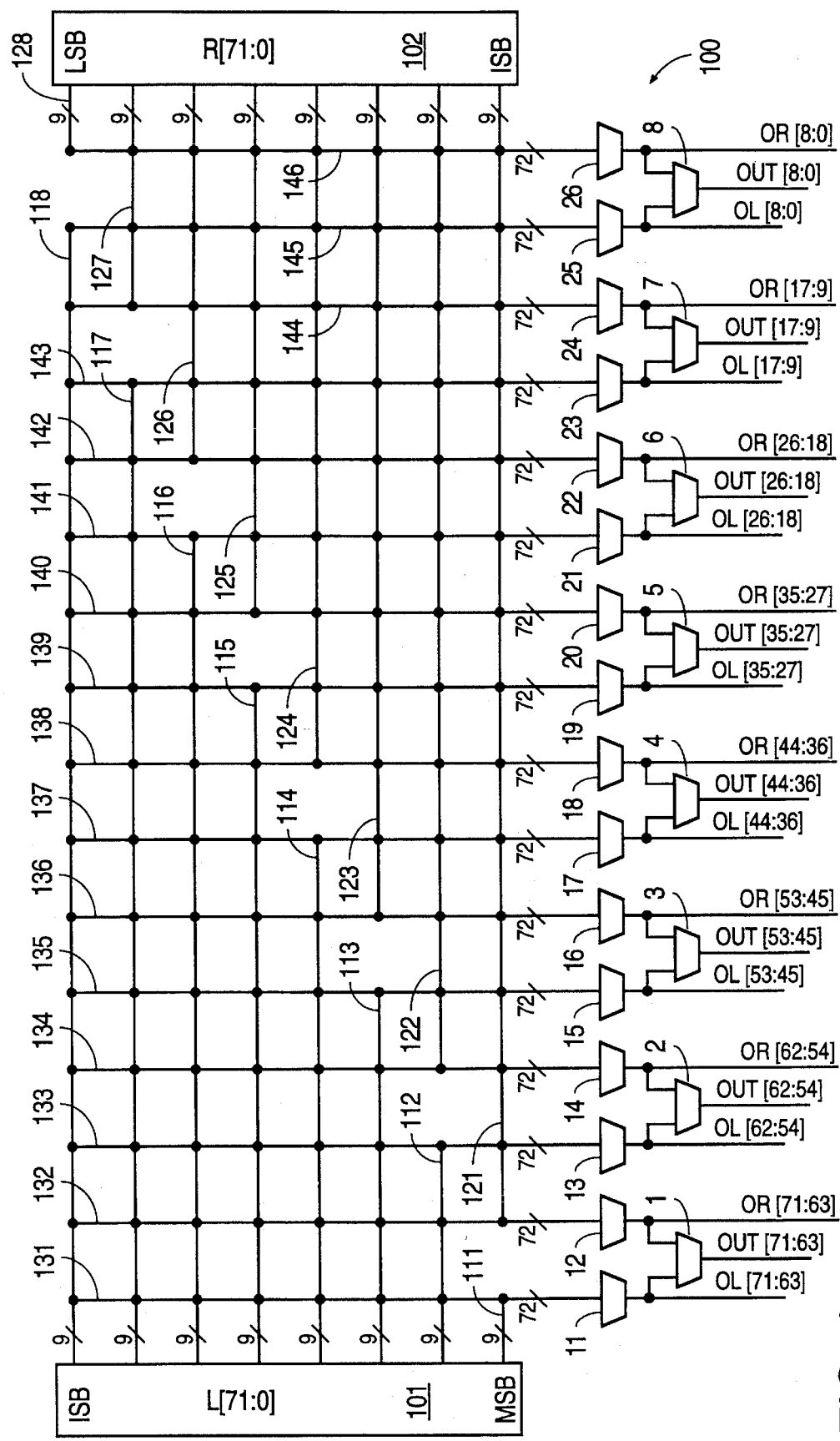
FIG. 1 is a block diagram of a shifter circuit in accordance with one embodiment of the present invention.

FIG. 1 is a block diagram illustrating one embodiment of shifter circuit 100 in accordance with one embodiment of the present invention. Shifter circuit 100 has two 72-bit input registers 101 and 102. Input register 101 receives a 72-bit input IL[71:0] which includes eight 9-bit bytes. Input IL[71:0] is ordered from a most significant byte, IL[71:63], to an intermediate significance byte, IL[8:0]. Input register 102 receives a 72-bit input IR[71:0] which also includes eight 9-bit bytes. Input IR[71:0] is ordered from an intermediate significance byte IR[71:63], to a least significant byte, IR[8:0].

Input register 101 is coupled to eight output buses 111–118. Each of buses 111–118 carries a 9-bit byte. Nine-bit bus 111 carries most significant byte IL[71:63] and 9-bit bus 118 carries intermediate significance byte IL[8:0].

Similarly, input register 102 is coupled to eight output buses 121–128. Each of buses 121–128 carries a 9-bit byte. Nine-bit bus 121 carries intermediate significance byte IR[71:63] and 9-bit bus 128 carries least significant byte IR[8:0].

Nine-bit buses 111–118 and 121–128 are coupled to multiplexers 11–26 through buses 131–146. Bus 131 couples each of 9-bit buses 111–118 to multiplexer 11. Multiplexer 11 is an 8-to-1 multiplexer which passes one of the bytes from 9-bit buses 111–118. Multiplexers 12–26 are 8-to-1 multiplexers similar to multiplexer 11.

Buses 132 and 133 couple 9-bit buses 112–118 and 121 to multiplexers 12 and 13, respectively. Buses 134 and 135 couple 9-bit buses 113–118 and 121–122 to multiplexers 14 and 15, respectively. Buses 136 and 137 couple 9-bit buses 114–118 and 121–123 to multiplexers 16 and 17, respectively. Buses 138 and 139 couple 9-bit buses 115–118 and 121–124 to multiplexers 18 and 19, respectively. Buses 140 and 141 couple 9-bit buses 116–118 and 121–125 to multiplexers 20 and 21, respectively. Buses 142 and 143 couple 9-bit buses 117–118 and 121–126 to multiplexers 22 and 23, respectively. Buses 144 and 145 couple 9-bit buses 118 and 121–127 to multiplexers 24 and 25, respectively. Bus 146 couples 9-bit buses 121–128 to multiplexer 26.

Each of multiplexers 11–26 pass a 9-bit byte, thereby creating two 72-bit outputs, OL[71:0] and OR[71:0]. Each byte of OL[71:0] is selected from one of eight adjacent bytes of the 16-byte concatenation of inputs IL[71:0] and IR[71:0]. Thus, the most significant byte OL[71:63] of output OL[71:0] is selected from one of the 8 bytes on buses 111–118. The second most significant byte OL[62:54] is selected from one of the eight bytes on buses 112–118 and 121. The least significant byte OL[8:0] is selected from one of the eight bytes on buses 118 and 121–127.

In a similar manner, the most significant byte OR[71:63] of output OR[71:0] is selected from one of the eight bytes on buses 112–118 and 121 and the least significant byte OR[8:0] is selected from one of the eight bytes on buses 121–128.

Each of multiplexers 11–26 is independently controlled. As a result, bytes from registers 101 and 102 can be reordered and shifted to perform data packing and unpacking. In one embodiment, the sixteen input bytes in registers 101 and 102 are packed into and out of two dimensional formats.

Shifter circuit 100 optionally employs multiplexers 1–8 to perform a bit shifting operation. Multiplexers 1, 2, 3, 4, 5, 6, 7 and 8 receive inputs from multiplexer pairs 11–12, 13–14, 15–16, 17–18, 19–20, 21–22, 23–24 and 25–26, respectively.

Figure 2:
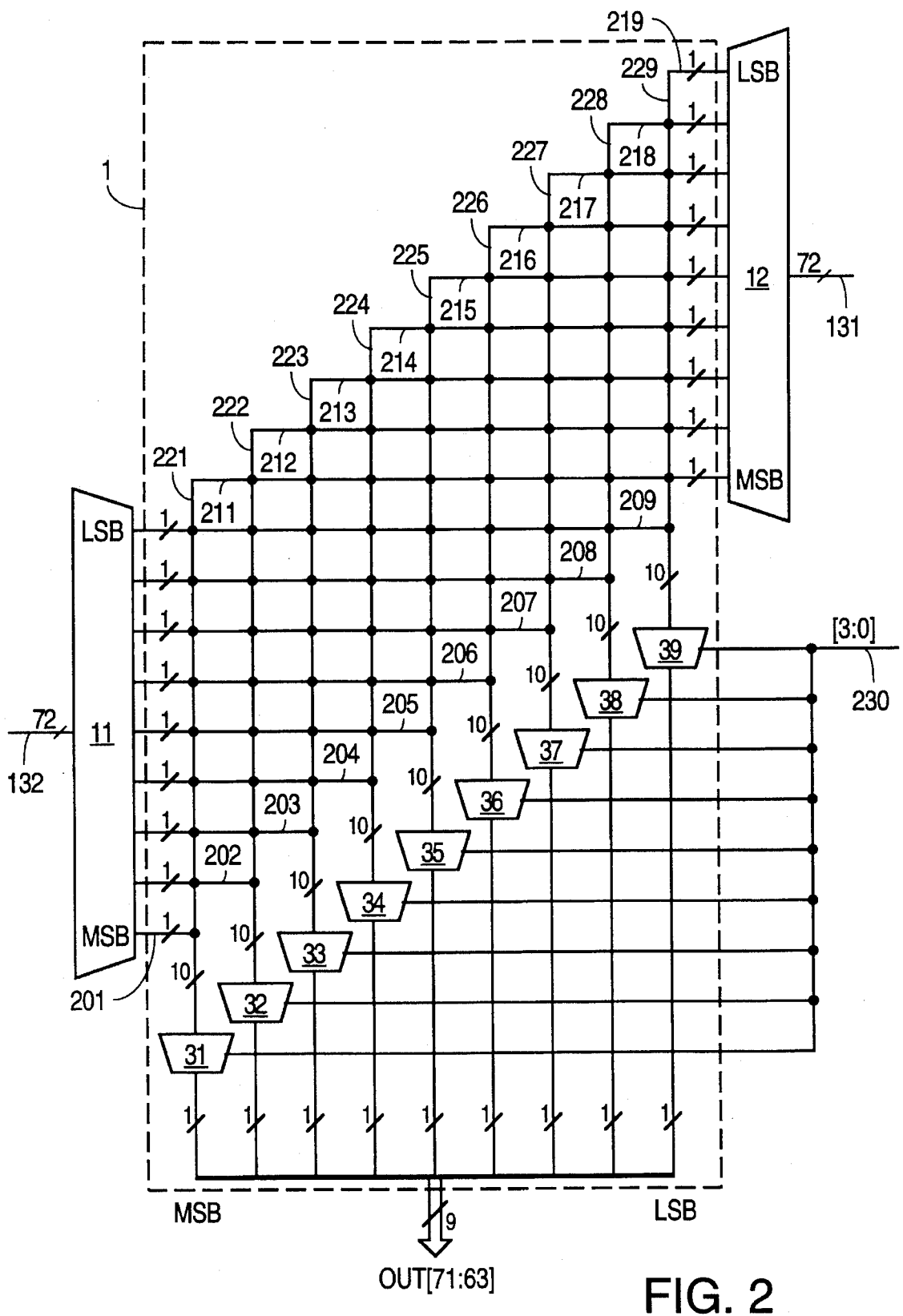
FIG. 2 is a block diagram of one of the bit shifting multiplexers of the shifter circuit of FIG. 1.

FIG. 2 is a block diagram of multiplexer 1 in accordance with one embodiment of the present invention. In this embodiment, multiplexers 2–8 are similar to multiplexer 1. Multiplexer 1 receives the 9-bit output OL[71:63] from multiplexer 11 and the 9-bit output OR[71:63] from multiplexer 12. The 9-bits of output OL[71:63] are provided from multiplexer 11 on buses 201–209, with bus 201 carrying the most significant bit and bus 209 carrying the least significant bit. The 9-bits of output OR[71:63] are provided from multiplexer 12 on buses 211–219, with bus 211 carrying the most significant bit and bus 219 carrying the least significant bit.

Multiplexers 31–39 are 10-to-1 multiplexers. Multiplexer 31 is coupled to buses 201–209 and 211. Multiplexer 32 is coupled to buses 202–209 and 211–212. Multiplexer 33 is coupled to buses 203–209 and 211–213. Multiplexer 34 is coupled to buses 204–209 and 211–214. Multiplexer 35 is coupled to buses 205–209 and 211–215. Multiplexer 36 is coupled to buses 206–209 and 211–216. Multiplexer 37 is coupled to buses 207–209 and 211–217. Multiplexer 38 is coupled to buses 208–209 and 211–218. Multiplexer 39 is coupled to buses 209 and 211–219.

Each of multiplexers 31–39 receives a 4-bit control signal C[3:0] on bus 230 to select the bits of output byte OUT[71:63]. Output byte OUT[71:63] consists of 9 consecutive bits of the 18-bit concatenation of OL[71:63] and OR[71:63].

Multiplexers 2, 3, 4, 5, 6, 7 and 8 operate in a manner similar to multiplexer 1 to create outputs OUT[62:54], OUT[53:45], OUT[44:36], OUT[35:27], OUT[26:18], OUT[17:9] and OUT[8:0], respectively.

Figure 3:
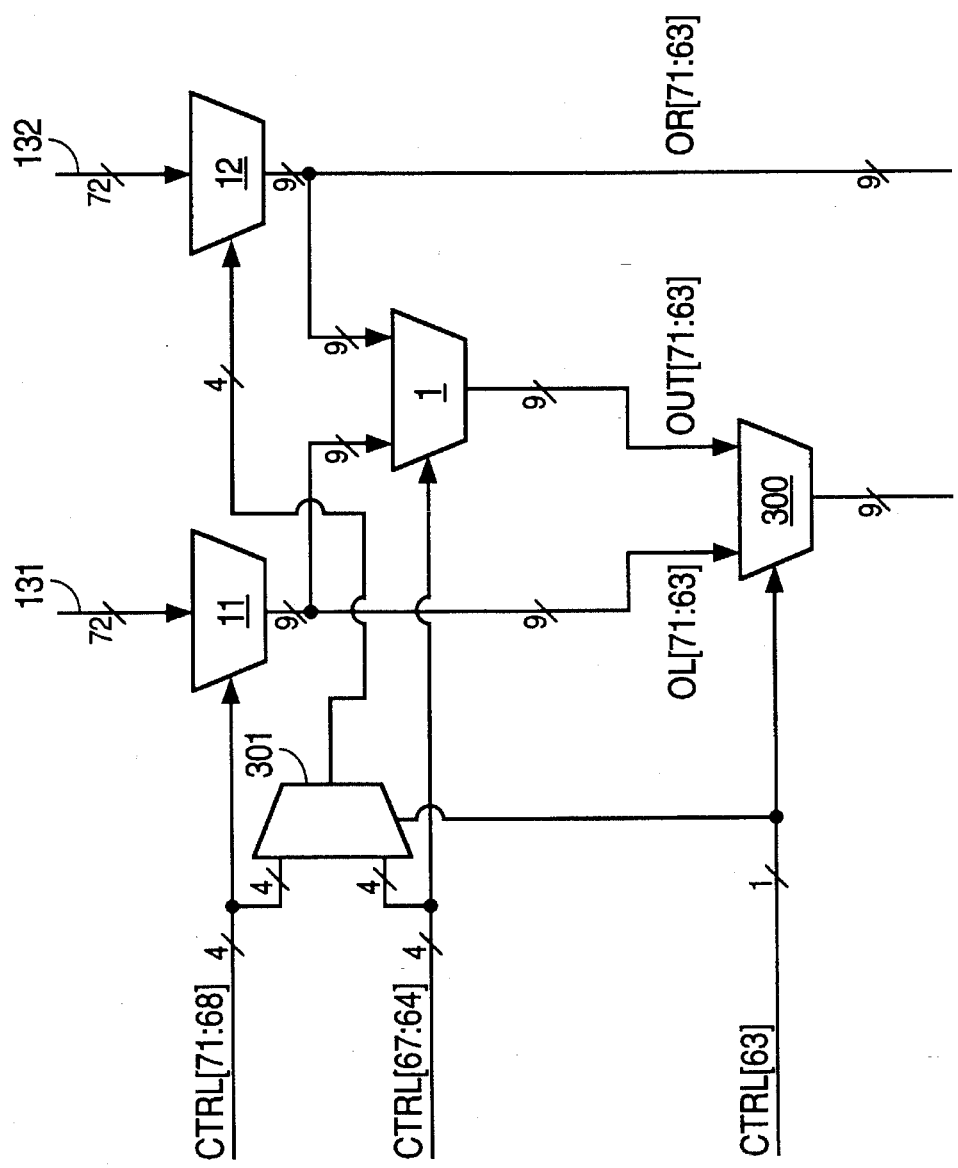
FIG. 3 is a schematic diagram illustrating the control of byte shifting multiplexers and bit shifting multiplexers in accordance with one embodiment of the present invention.

FIG. 3 is a schematic diagram which illustrates the control of multiplexers 1, 11 and 12 in accordance with one embodiment of the present invention. In this embodiment, a 9-bit control signal, CTRL[71:63] and multiplexers 300 and 301 are used to control the operation of multiplexers 1, 11 and 12.

To select bytes 0L[71:63] and 0R[71:63] for output, control bits CTRL[71:68] are provided to multiplexer 11. In response, multiplexer 11 passes the desired byte (i.e., OL[71:63]) from bus 131 through multiplexer 11. Control bit CTRL[63] is provided to multiplexer 301, such that multiplexer 301 passes control bits CTRL[67:64] to multiplexer 12. In response, multiplexer 12 passes the desired byte (i.e., OR[71:63]) from bus 132 through multiplexer 12. Control bit CTRL[63] is also provided to multiplexer 300. In response, multiplexer 300 passes the output of multiplexer 11 (i.e., 0L[71:63]) through multiplexer 300.

To select byte OUT[71:63] for output, control bits CTRL [71:68] are provided to multiplexer 11. Control bit CTRL [63] is selected such that multiplexer 301 transmits control bits CTRL[71:68] to multiplexer 12. Thus, multiplexers 11 and 12 receive the same four control bits. Because the eight bytes input to multiplexers 11 and 12 are offset by one byte, the application of the same control bits to multiplexers 11 and 12 results in the selection of consecutive bytes. Table 1 below sets forth one embodiment of the consecutive bytes which can be selected by control bits CTRL[71:68].

TABLE 1

| Control Bits CTRL[71:68] | OL[71:63] From MUX 11 | OR[71:63] From MUX 12 |
|---|---|---|
| 0000 | IL[8:0] | IR[71:63] |
| 0001 | IL[17:9] | IL[8:0] |
| 0010 | IL[26:18] | IL[17:9] |
| 0011 | IL[35:27] | IL[26:18] |
| 0100 | IL[44:36] | IL[35:27] |
| 0101 | IL[53:45] | IL[44:36] |
| 0110 | IL[62:54] | IL[53:45] |
| 0111 | IL[71:63] | IL[62:54] |

The bytes passed through multiplexers 11 and 12 are provided to multiplexer 1. Multiplexer 1 receives control bits CTRL[67:64] and in response, performs the bit shifting function previously described in connection with FIG. 2. The bits passed through multiplexer 1 (i.e., OUT[71:63]) are provided to multiplexer 300. In response to control bit CTRL[63], multiplexer 300 passes the output byte OUT [71:63].

Multiplexers 2–8 and 12–26 are controlled in a manner similar to multiplexers 1, 11 and 12. In the embodiment previously described, multiplexers 2, 13 and 14 are controlled by control bits CTRL[62:54], multiplexers 3, 15 and 16 are controlled by control bits CTRL[53:45], multiplexers 4, 17 and 18 are controlled by control bits CTRL[44:36], multiplexers 5, 19 and 20 are controlled by control bits CTRL[35:27], multiplexers 6, 21 and 22 are controlled by control bits CTRL[26:18], multiplexers 7, 23 and 24 are controlled by control bits CTRL[17:9] and multiplexers 8, 25 and 26 are controlled by control bits CTRL[8:0]. Thus, multiplexers 1–8 and 11–26 are controlled by a 72-bit control signal CTRL[71:0].

Because multiplexers 1–8 and 11–26 are operated from the same control signal, the byte shifting and reordering functions performed by multiplexers 11–26 and the bit shifting function performed by multiplexers 1–8 can be executed in one clock cycle. This advantageously increases the speed of shifter circuit 100. Shifter circuit 100 also eliminates the need for separate byte shifting and reordering circuitry, thereby reducing the layout area of shifter circuit 100.

In an alternate embodiment of the present invention, the control circuit is modified to allow for independent control of the bytes passed through multiplexers 11–26 during a bit shifting operation. That is, any of the bytes applied to multiplexers 11–26 (not just consecutive bytes) can be passed through multiplexers 11–26 during a bit shifting operation. The modified control circuit requires eighty bits: three bits to control each of multiplexers 11–26 and four bits to control each of multiplexers 1–8.

Figure 4:
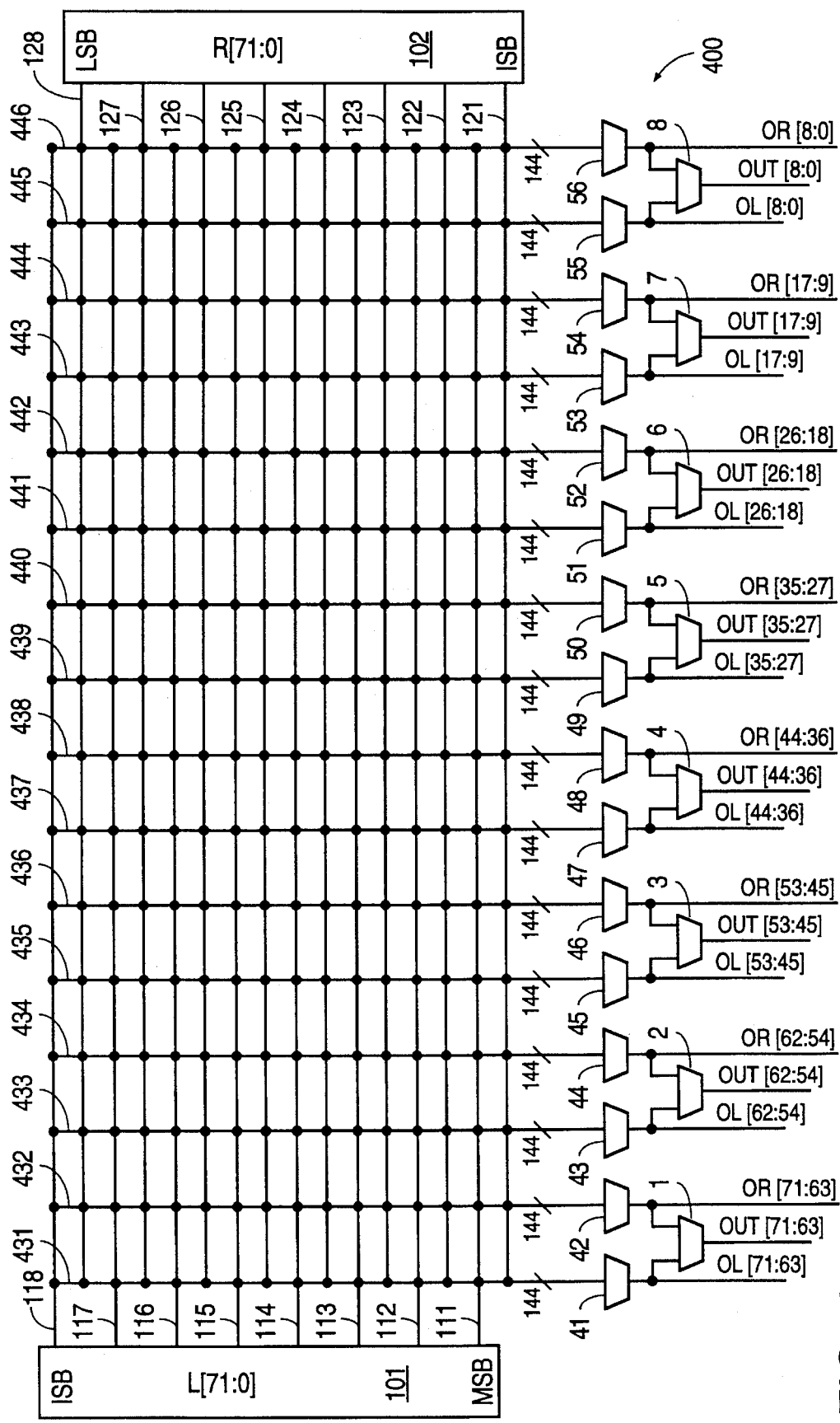
FIG. 4 is a schematic diagram of a shifter circuit in accordance with an alternate embodiment of the present invention.

FIG. 4 is a schematic diagram of a shifter circuit 400 in accordance with an alternate embodiment of the present invention. Because shifter circuit 400 is similar to shifter circuit 100 (FIG. 1), similar elements in shifter circuits 100 and 400 are labeled with similar numbers. Each of buses 431–446 receive all sixteen 9-bit bytes from registers 101 and 102. Hence, each of buses 431–446 is 144 bits wide and carries sixteen byte of information. Multiplexers 41–56 are 16-to-1 multiplexers.

In one embodiment, the same decoder circuitry illustrated in FIG. 3 is utilized in shifter circuit 400. For example, multiplexers 41 and 42 can be substituted for multiplexers 11 and 12 in FIG. 3. Because multiplexers 11 and 12 (FIG. 3) are controlled with four control bits CTRL[71:68], the associated control circuitry is capable of decoding up to sixteen combinations of consecutive bytes. Table 2 below sets forth one embodiment of the consecutive bytes which can be passed through multiplexers 41 and 42 in response to control bits CTRL[71:68] in shifter circuit 400. Because each of multiplexers 41–56 in shifter circuit receive the same sixteen bytes from registers 101 and 102, Table 2 is applicable to each of multiplexers 41–56.

TABLE 1

| Control Bits CTRL[71:68] | OL[71:63] From MUX 41 | OR[71:63] From MUX 42 |
|---|---|---|
| 0000 | IR[17:9] | IR[8:0] |
| 0001 | IR[26:18] | IR[17:9] |
| 0010 | IR[35:27] | IR[26:18] |
| 0011 | IR[44:36] | IR[35:27] |
| 0100 | IR[53:45] | IR[44:36] |
| 0101 | IR[62:54] | IR[53:45] |
| 0110 | IR[71:63] | IR[62:54] |
| 0111 | IL[8:0] | IR[71:63] |
| 1000 | IL[17:9] | IL[8:0] |
| 1001 | IL[26:18] | IL[17:9] |
| 1010 | IL[35:27] | IL[26:18] |
| 1011 | IL[44:36] | IL[35:27] |
| 1100 | IL[53:45] | IL[44:36] |
| 1101 | IL[62:54] | IL[53:45] |
| 1110 | IL[71:63] | IL[62:54] |

Like shifter circuit 100, shifter circuit 400 is capable of performing the byte shifting and reordering functions and the bit shifting function in the same clock cycle. As previously discussed, this increases the speed and reduces the layout area of shifter circuit 400.

While the present invention has been described in connection with a particular embodiment, it is understood that invention is not limited to the embodiment disclosed, but is capable of various modifications which would be apparent to one of ordinary skill in the art. Thus, the present invention is limited only by the following claims.

I claim:

1. A shifter circuit comprising:

a first register;

a plurality of first buses coupled to said first register, each of said first buses receiving a data byte from said first register;

a second register;

a plurality of second buses coupled to said second register, each of said second buses receiving a data byte from said second register;

a multiplicity of third buses, wherein each of said third buses is made up of all of said first and second buses, whereby each of said third buses receives all of the data bytes form the first and second registers;

a multiplicity of byte shifting multiplexers, each having output terminals, wherein each of said byte shifting multiplexers is coupled to a corresponding one of said third buses;

a plurality of bit shifting multiplexers, wherein each of said bit shifting multiplexers is coupled to the output terminals of a corresponding pair of said byte shifting multiplexers; and a control circuit coupled to said byte shifting multiplexers and said bit shifting multiplexers.

2. The shifter circuit of claim 1, wherein said control circuit further comprises:

means for independently enabling each byte shifting multiplexer to selectively pass one of the data bytes from the third bus coupled to the byte shifting multiplexer.

3. The shifter circuit of claim 2, wherein each of the data bytes includes a plurality of bits, and the control circuit further comprises:

means for enabling each pair of byte shifting multiplexers to selectively pass an adjacent pair of data bytes from the third buses coupled to the pair of byte shifting multiplexers, whereby each adjacent pair of the data bytes is passed to a corresponding bit shifting multiplexer; and means for independently enabling each bit shifting multiplexer to selectively pass a plurality of adjacent bits from the received adjacent pair of data bytes.

4. A shifter circuit comprising:

a first register;

a plurality of first buses coupled to said first register, each of said first buses receiving a data byte from said first register;

a second register;

a plurality of second buses coupled to said second register, each of said second buses receiving a data byte from said second register;

a first multiplexer coupled to each of said first buses, whereby said first multiplexer receives each data byte from said first register;

a second multiplexer coupled to each of said second buses, whereby said second multiplexer receives each data byte from said second register;

a multiplicity of intermediate multiplexers, each coupled to at least one of said first buses and at least one of said second buses, whereby each intermediate multiplexer receives data bytes from said first and second registers; and a control circuit coupled to said first, second and intermediate multiplexers, wherein said control circuit independently controls each of said first, second and intermediate multiplexers to selectively pass data bytes from the first and second registers.

5. The shifter circuit of claim 4, wherein there are N first buses, N second buses and (2×N)−2 intermediate multiplexers, N being an integer greater than one.

6. The shifter of claim 5, wherein N is equal to eight.

7. The shifter of claim 6, wherein said intermediate multiplexers comprise:

third and fourth multiplexers, each coupled to one of said second buses and seven of said first buses;

fifth and sixth multiplexers, each coupled to two of said second buses and six of said first buses;

seventh and eighth multiplexers, each coupled to three of said second buses and five of said first buses;

ninth and tenth multiplexers, each coupled to four of said second buses and four of said first buses;

eleventh and twelfth multiplexers, each coupled to five of said second buses and three of said first buses;

thirteenth and fourteenth multiplexers, each coupled to six of said second buses and two of said first buses; and fifteenth and sixteenth multiplexers, each coupled to seven of said second buses and one of said first buses.

8. The shifter circuit of claim 4, wherein each of the data bytes includes a plurality of bits, the shifter circuit further comprising a plurality of bit shifting multiplexers coupled to said first, second and intermediate multiplexers and to said control circuitry, wherein each of said bit shifting multiplexers is independently controlled by said control circuitry to selectively pass a plurality of adjacent bits from said first and second registers.

9. The shifter circuit of claim 8, wherein each of said bit shifting multiplexers is coupled to two of said first, second and intermediate multiplexers.

10. A method comprising the steps of:

storing a plurality of data bytes in a first register in a particular order;

storing a plurality of data bytes in a second register in a particular order;

transmitting the plurality of ordered data bytes from a first register to a plurality of byte shifting multiplexers, wherein each of the byte shifting multiplexers receives each of the ordered data bytes from the first register;

transmitting the plurality of ordered data bytes from a second register to the ordered byte shifting multiplexers, wherein each of the byte shifting multiplexers receives each of the ordered data bytes from the second register;

defining the byte shifting multiplexers to have a particular order; and routing a data byte through each of the byte shifting multiplexers, wherein the data byte routed through each byte shifting multiplexer is selected from a group which includes all of the data bytes received from the first and second registers, whereby the ordered data bytes from the first and second registers are reordered.

11. The method of claim 10, wherein each of the data bytes includes a plurality of bits, the method further comprising the steps of:

routing adjacent pairs of the ordered data bytes through corresponding adjacent pairs of the byte shifting multiplexers;

transition each of the adjacent pairs of the ordered data bytes to a corresponding bit shifting multiplexer;

routing a data byte through each of the bit shifting multiplexers, wherein the data byte routed through each bit shifting multiplexer includes a plurality of adjacent bits from the adjacent pair of data bytes received by the bit shifting multiplexer.

12. A method comprising the steps of:

storing a first plurality of data bytes in a first register in a particular order;

storing a second plurality of data bytes in a second register in a particular order;

transmitting the first plurality of ordered data bytes from the first register to a first byte shifting multiplexer;

transmitting the second plurality of ordered data bytes from the second register to a second byte shifting multiplexer;

transmitting at least one of the first plurality of data bytes from the first register and at least one of the second plurality of data bytes from the second register to each of a multiplicity of intermediate byte shifting multiplexers;

defining the first, intermediate and second byte shifting multiplexers to have a particular order;

routing one of the first plurality of data bytes transmitted from the first register through the first byte shifting multiplexer;

routing one of the second plurality of data bytes transmitted from the second register through the second byte shifting multiplexer; and routing one of the data bytes transmitted to an intermediate byte shifting multiplexer through said intermediate multiplexer, whereby the ordered data bytes from the first and second registers are reordered.

13. The method of claim 12, wherein the step of routing one of the data bytes through said intermediate multiplexer further comprises the step of routing a plurality of data bytes through the intermediate byte shifting multiplexers, wherein each intermediate multiplexer routes a data byte which is selected from the data bytes applied to said intermediate byte shifting multiplexer.

14. The method of claim 13, wherein each data byte includes a plurality of data bits, further comprising the steps of:

routing adjacent pairs of the ordered data bytes through corresponding adjacent pairs of the ordered first, intermediate and second byte shifting multiplexers;

transmitting each of the adjacent pairs of the ordered data bytes to a corresponding bit shifting multiplexer; and routing a data byte through each of the bit shifting multiplexers, wherein the data byte routed through each bit shifting multiplexer includes a plurality of adjacent bits from the adjacent pair of data bytes received by the bit shifting multiplexer.

* * * * *